United States Patent Office 3,505,489
Patented Apr. 7, 1970

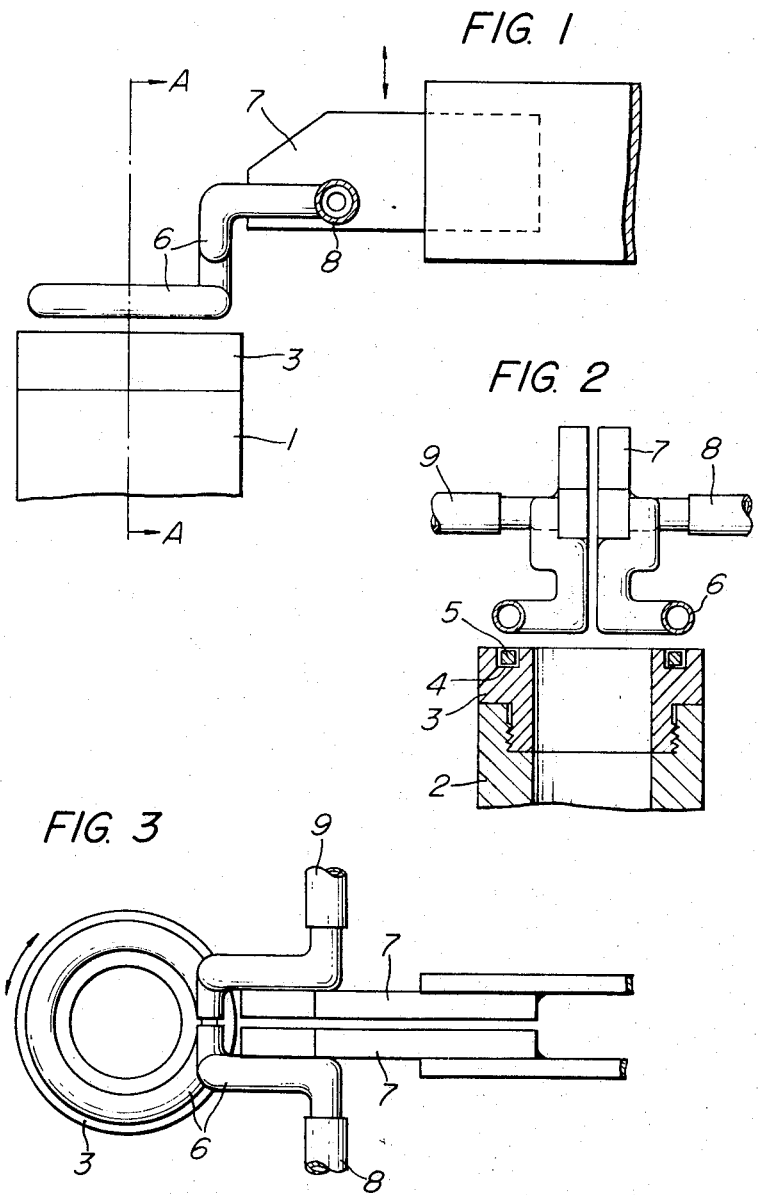

3,505,489
METHOD OF DEPOSITING CORROSION-RESISTING AND WEAR-RESISTING ALLOY ON CONTACT PARTS BETWEEN VALVE MEMBERS AND VALVE SEATS
Yotaro Tsuge, Fujisawa-shi, Katsuki Shioya, Musashino-shi, and Tsukasa Tani, Yokohama, Japan, assignors to Hitachi Metals, Ltd., Tokyo, Japan, a corporation of Japan
Filed Dec. 6, 1966, Ser. No. 599,616
Claims priority, application Japan, Dec. 10, 1965, 40/75,556
Int. Cl. B23k 13/02
U.S. Cl. 219—9.5     10 Claims

ABSTRACT OF THE DISCLOSURE

The present disclosure is directed to a process and apparatus for depositing a corrosion-resisting and wear-resisting alloy on a fluid-tight seating surface of a valve element comprising the steps of providing an annular groove on the fluid-tight seating surface of the valve element, inserting a ring of corrosion-resisting and wear-resisting alloy in said annular groove, disposing said valve element beneath high frequency induction heating means so that said ring can be brought to a position facing the high frequency induction heating coil of said high frequency induction heating means, supplying a high frequency current to said high frequency induction heating coil in an atmosphere of inert gas to cause fusion of said ring in said atmosphere, and allowing said valve element to gradually cool.

---

This invention relates to a method of depositing a corrosion-resisting and wear-resisting alloy such, for example, as a cobalt-base alloy or nickel-base alloy on valve members and valve seats of fluid valve devices and the like to thereby provide fluid-tight seating surfaces of corrosion-resisting and wear-resisting nature on such valve members and valve seats.

Heretofore fluid-tight seating surfaces of valve elements that is, valve members and valve seats of fluid valve devices and the like have commonly been provided by manual surfacing welding operation by use of a welding rod of wear-resisting alloy and an excess flame of acetylene and by subsequent machining or the like on these fluid-tight seating surfaces. The prior method of such seating surface preparation has not only required the skill of workers but also has been defective in that blow holes and insufficient deposition of metal are liable to occur at the surfaced portions.

It is therefore the primary object of the present invention to provide a novel method of metal deposition which eliminates the defects involved in the prior method as described above and can give highly efficient and improved results of metal deposition on such fluid-tight seating surfaces.

The present invention contemplates the provision of an improved and highly efficient method of metal deposition which is quite free from the above prior defects and which includes preforming an annular grove on the fluid-tight seating surface of a valve element, inserting and holding in this annular groove a ring of corrosion-resisting and wear-resisting alloy which has been cast to the form and may have then been subjected to machining or the like as desired, and heating the ring in an atmosphere of inert gas by means of high frequency induction heating so as to deposit the metal to form the desired fluid-tight seating surface.

Figure 4:
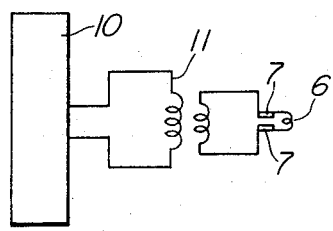
Figure 8:
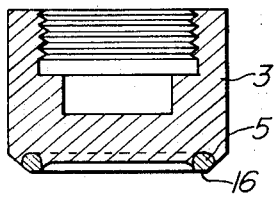
Figure 5:
Figure 9:
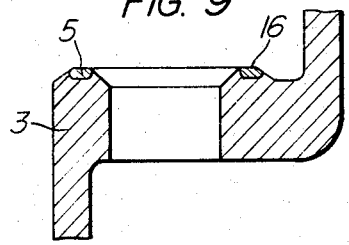
Figure 6:
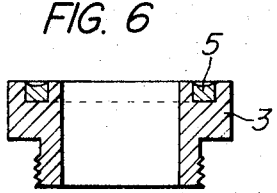
Figure 10:
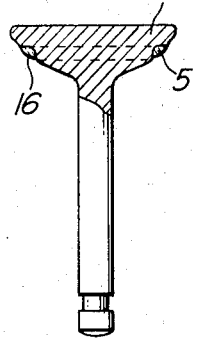
Figure 7:
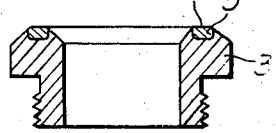
Figure 11:
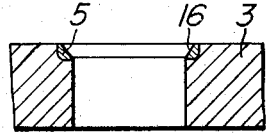
Figure 12:
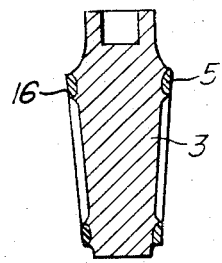
Figure 13:
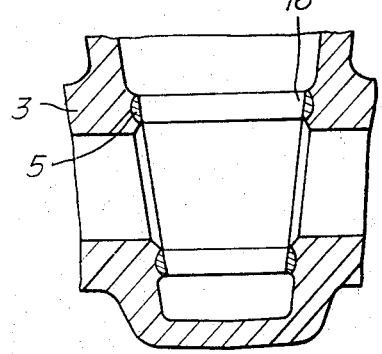
Figure 14:
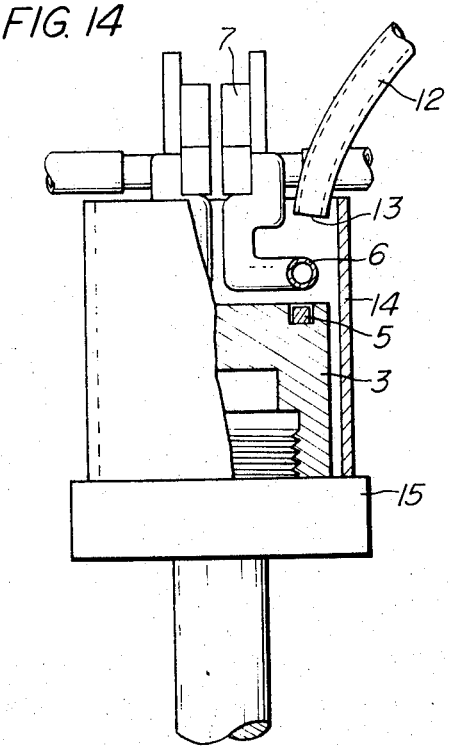

The above and other objects, advantages and features of the present invention will become apparent from the following description with reference to the accompanying drawings, in which:

FIG. 1 is a schematic illustration of the device employed for metal deposition according to the present invention;
FIG. 2 is a sectional view taken along the line A—A in FIG. 1;
FIG. 3 is a plan view of FIG. 1;
FIG. 4 is a connection diagram of high frequency induction heating means employed in the method of the present invention;
FIG. 5 is a partly sectional side view of a ring of corrosion-resisting and wear-resisting alloy;
FIG. 6 is a partly sectional side view of a valve seat after the ring of corrosion-resisting and wear-resisting alloy has been deposited in an annular groove on the valve seat;
FIG. 7 is a partly sectional side view of the valve seat which has been finished to a desired shape after deposition of the ring of corrosion-resisting and wear-resisting alloy on the valve seat;
FIGS. 8 to 13 are partly sectional side views and sectional views of various forms of valve elements having fluid-tight seating surfaces provided by the method according to the present invention; and
FIG. 14 is a partly sectional side view showing the detail of the device employed in the method according to the present invention.

Referring now to the drawings, a fluid valve device is partly shown and is generally designated by reference numeral 1. The fluid valve device 1 includes a valve casing 2 and a valve seat 3 screwed into the valve casing 2. An annular groove 4 is provided on a fluid-tight seating surface 16 of the valve seat 3, and a ring 5 of corrosion-resisting and wear-resisting alloy such, for example, as a cobalt-base or nickel-base alloy which has been, either cast or machined thereafter to the desired shape is placed in the annular groove 4 and held therein. A water-cooled heating coil 6 in the form of a hollow pipe of copper or like material is mounted on a vertically slidable support block 7 so that the heating coil 6 can be adjustably supported at a suitable position above the ring 5 of corrosion-resisting and wear-resisting alloy received in the annular groove 4. The heating coil 6 has a cooling water inlet 8 and a cooling water outlet 9. The high frequency generator 10 is so designed as to cause flow of a high frequency of less than 200 kilocycles per second through the heating coil 6 by way of a transformer 11 and the support block 7. An inert gas such, for example, as nitrogen or argon is supplied through a supply conduit 12 and through its supply port 13 into a cylindrical cover member 14 sealingly surrounding the valve seat 3 to maintain an atmosphere of non-oxidizing nature during the step of fusion of the alloy. The valve seat 3 is mounted on a turntable 15 which is continuously rotated by an electric motor (not shown) during the time said valve seat is being heated by the high frequency induction heating means so that the heating can be properly effected to the entire peripheries of the ring 5 of corrosion-resisting and wear-resisting alloy and to the annular groove 4 in the fluid valve device 1.

In an experiment made by the inventors by use of the arrangement as described above, argon gas was supplied from the supply port 13 of the inert gas supply conduit 12 into the cylindrical cover member 14 to fill the interior of the latter with argon gas. While continuously supplying the argon gas, the turntable 15 having the valve seat 3 mounted thereon was rotated, and at the same time a relatively weak power of 7 kilowatts was at first supplied to the heating coil 6 to thereby gradually heat the ring 5 of corrosion-resisting and wear-resisting alloy and those portions of the valve seat 3 adjacent to the annular groove 4 holding therein the ring 5. In about 10 seconds those portions adjacent to the annular groove 4 were heated to a preheating temperature of more than about 600° C. Then the electric power was switched over to 11 kilowatts, which is higher than the previous value of preheating, for thereby rapidly heating the ring 5 of corrosion-resisting and wear-resisting alloy. In about 10 seconds application of the 11 kilowatt power, the ring 5 of corrosion-resisting and wear-resisting alloy was fused to fill the annular groove 4 on the valve seat 3 and the supply of electric power was stopped. After the fused ring 5 of corrosion-resisting and wear-resisting alloy solidified, the valve seat 3 was dismounted from the turntable 15 and then allowed to slow cooling and was subjected to finishing work. FIG. 6 shows a state just after the fused ring 5 of corrosion-resisting and wear-resisting alloy filled the annular groove 4 on the valve seat 3, while FIG. 7 shows a state after the fluid-tight seating surface 16 of the valve seat 3 was finished to the desired shape.

The ring 5 of corrosion-resisting and wear-resisting alloy used in the embodiment of the invention had an outside diameter of 35 mm., and the alloy consisted by weight of 1.0% carbon, 28% chromium, 4.0% tungsten, up to 3.1% iron and the balance of coblat and had a melting point of 1290° C. and a hardness of 44 HRC. Further, the valve seat 3 was made from 18–8 stainless steel having a melting point of 1400° C. and had an outside diameter of about 40 mm.

Good results could be obtained when the position of the support block 7 was adjusted in the direction of arrow in FIG. 1 to give a spacing of about 2 mm. between the lower face of the heating coil 6 and the upper face of the valve seat 3 and when a high frequency current at frequency of 100 kilocycles per second was made to flow through the heating coil 6.

The purpose of preheating the ring of corrosion-resisting and wear-resisting alloy and the annular groove portion by preliminary application of weak electric power is to prevent non-uniform heating in the later heating step and to positively maintain the temperature of the annular groove portion at the welding temperature when the ring is heated to fuse. It is therefore possible to easily control the welding temperature and to thereby obtain good results of deposition by suitably varying the duration of preheating and the value of electric power used in the preheating. It will be understood that by the provision of the step of preheating, the time during which the annular groove portion is kept at the required welding temperature can be extremely shortened, and therefore the degree of deterioration of the seating surface due to an absorption of harmful environment gas is lowered greatly as compared with the case of rapid heating without preheating where usually accompanies an absorption of harmful environment gas due to overheating.

However it is to be understood that depending upon the sectional configuration and size of the valve element metal deposition may be effected without preheating and/or without rotating of such valve elements.

Where uniform heating is unobtainable by a single heating coil due to non-uniform thicknesses of the valve element, a plurality of heating coils may be employed to effect a satisfactorily uniform preheating. Further the supply of high frequency electric power may be controlled automatically so that the operation can be effected under a more stable and efficient condition.

From the foregoing description it will be appreciated that the present invention provides a novel metal deposition technique which enables a defect-free metal deposit along with a higher operating efficiency. These outstanding features of the invention were brought about by the fact that the shapes of both a ring of corrosion-resisting and wear-resisting alloy and a heating coil, were adequately determined together with appropriate relative location thereof, and also by the controlled power means for heating only the ring and the interior portion of annular groove adjoining thereof and thereby melt only the ring of corrosion-resisting and wear-resisting alloy.

What is claimed is:

1. A method of depositing a corrosion-resisting and wear-resisting alloy on a fluid-tight seating surface of a valve element comprising the steps of providing an annular groove on the fluid-tight seating surface of the valve element, inserting a ring of corrosion-resisting and wear-resisting alloy in said annular groove, disposing said valve element beneath high frequency induction heating means so that said ring can be brought to a position facing the high frequency induction heating coil of said high frequency induction heating means, supplying a high frequency current to said high frequency induction heating coil in an atmosphere of inert gas to cause fusion of said ring in said atmosphere, and allowing said valve element to gradually cool.

2. The method of depositing a corrosion-resisting and wear-resisting alloy on a fluid-tight seating surface of a valve element according to claim 1, wherein the high frequency current is supplied to said high frequency induction heating coil in such away that said ring of corrosion-resisting and wear-resisting alloy is at first gradually heated up to a predetermined preheating temperature and, after said predetermined preheating temperature is reached, said ring is rapidly heated until it is fused.

3. The method according to claim 1, wherein, in the course of said step of supplying the high frequency current to said high frequency induction heating coil, said valve element is positioned beneath the high frequency induction heating coil and is caused to rotate continuously during the heating.

4. The method according to claim 1, wherein, said corrosion-resisting and wear-resisting alloy is selected from the group consisting of cobalt-base alloys and nickel-base alloys.

5. The method according to claim 2, in which said predetermined preheating temperature is about 600° C.

6. The method of claim 1, wherein the alloy consists essentially of 28% chromium, 4.0% tungsten, 1.0% carbon, up to about 3.1% iron and the essential balance being cobalt.

7. An apparatus for depositing a corrosion-resisting and wear-resisting alloy on a fluid-tight seating surface of a valve member which comprises a valve member containing an annular groove in its fluid-tight seating surface, said groove being adapted to receive a ring of corrosion-resisting and wear-resisting alloy, high frequency induction heating means slidably disposed above the valve member so that said heating means can be positioned above the ring of corrosion-resisting and wear-resisting alloy disposed in the annular groove, means for supplying a high frequency current to said high frequency induction heating coil and means for supplying an inert gas atmosphere to the vicinity of the alloying zone.

8. The apparatus of claim 7, wherein the heating coil is provided with a cooling water inlet and a cooling water outlet.

9. The apparatus of claim 7, wherein the valve member is mounted to a turntable, and motor means are provided for rotating said turntable.

10. The apparatus of claim 7, wherein the heating coil and the valve member are disposed in a cover member.

References Cited

UNITED STATES PATENTS

| 1,709,606 | 4/1929 | Catland | 219—77 X |
| 2,358,090 | 9/1944 | Longoria | 219—117 X |
| 2,471,948 | 5/1949 | Gibian et al. | 219—117 X |
| 2,653,210 | 9/1953 | Becker et al. | 219—9.5 |

J. V. TRUHE, Primary Examiner